US011015088B2

(12) United States Patent
Tully et al.

(10) Patent No.: US 11,015,088 B2
(45) Date of Patent: *May 25, 2021

(54) CYANOACRYLATE COMPOSITIONS

(71) Applicant: Henkel IP & Holding GmbH, Duesseldorf (DE)

(72) Inventors: Raymond Tully, Slane (IE); Rory Barnes, Dublin (IE); Mark Loane, Dublin (IE); Robert Lambert, Dublin (IE); Ceclile Ollagnier, Dublin (IE)

(73) Assignee: Henkel IP & Holding GmbH, Duesseldorf (DE)

( * ) Notice: Subject to any disclaimer, the term of this patent is extended or adjusted under 35 U.S.C. 154(b) by 232 days.

This patent is subject to a terminal disclaimer.

(21) Appl. No.: 15/972,892

(22) Filed: May 7, 2018

(65) Prior Publication Data
US 2018/0251659 A1   Sep. 6, 2018

Related U.S. Application Data

(63) Continuation of application No. PCT/EP2016/076753, filed on Nov. 4, 2016.

(30) Foreign Application Priority Data

Nov. 6, 2015  (GB) ..................... 1519651

(51) Int. Cl.
C09J 4/06 (2006.01)
C09J 5/00 (2006.01)
C09J 11/04 (2006.01)
C09J 11/08 (2006.01)
C08F 222/10 (2006.01)
C08F 222/32 (2006.01)

(52) U.S. Cl.
CPC . C09J 4/06 (2013.01); C09J 5/00 (2013.01); C09J 11/04 (2013.01); C09J 11/08 (2013.01); C08F 222/1006 (2013.01); C08F 222/32 (2013.01); C09J 2400/166 (2013.01); C09J 2423/04 (2013.01); C09J 2433/00 (2013.01)

(58) Field of Classification Search
CPC ....... C09J 4/06; C09J 5/00; C09J 11/04; C09J 11/08; C09J 2400/166; C09J 2423/04; C09J 2423/00; C08F 222/1006; C08F 222/32
USPC ...................................... 524/321
See application file for complete search history.

(56) References Cited

U.S. PATENT DOCUMENTS

| 3,832,334 | A |   | 8/1974  | O Sullivan et al. |
| 4,196,271 | A |   | 4/1980  | Kimura et al. |
| 4,440,910 | A |   | 4/1984  | O'Connor |
| 4,450,265 | A |   | 5/1984  | Harris |
| 4,490,515 | A | * | 12/1984 | Mariotti ............ C09J 4/00 526/204 |
| 4,532,293 | A |   | 7/1985  | Ideka et al. |
| 4,556,700 | A |   | 12/1985 | Harris et al. |
| 4,622,414 | A |   | 11/1986 | Mckervey |
| 4,636,539 | A |   | 1/1987  | Harris et al. |
| 4,695,615 | A |   | 9/1987  | Leonard et al. |
| 4,718,966 | A |   | 1/1988  | Harris et al. |
| 4,837,260 | A |   | 6/1989  | Sato et al. |
| 4,855,461 | A |   | 8/1989  | Harris et al. |
| 4,906,317 | A |   | 3/1990  | Liu |
| 5,288,794 | A |   | 2/1994  | Attarwala |
| 5,312,864 | A |   | 5/1994  | Wenz et al. |
| 5,328,944 | A | * | 7/1994  | Attarwala .......... C09J 4/00 524/83 |
| 5,424,343 | A |   | 6/1995  | Attarwala |
| 5,530,037 | A |   | 6/1996  | Mcdonnell et al. |
| 5,536,799 | A |   | 7/1996  | Takahashi et al. |
| 5,922,783 | A | * | 7/1999  | Wojciak .......... C08F 2/50 522/18 |
| 6,294,629 | B1 |  | 9/2001  | O'Dwyer et al. |
| 6,607,632 | B1 |  | 8/2003  | Mcdonnell et al. |
| 9,249,237 | B2 | * | 2/2016 | Perichaud ............ C08F 265/04 |
| 2008/0314519 | A1 | * | 12/2008 | Attarwala ........... C08L 2666/02 156/331.8 |
| 2014/0124137 | A1 | * | 5/2014 | Hedderman ........... C09J 133/18 156/331.8 |

FOREIGN PATENT DOCUMENTS

| CN | 1248995 A   | 3/2000 |
| JP | H06-145606  | 5/1994 |
| WO | 2007008971  | 1/2007 |

OTHER PUBLICATIONS

International Search Report issued in connection with International Patent Application No. PCT/EP2016/076753 dated Jan. 12, 2017.
H.V. Coover, D.W. Dreifus and J.T. O'Connor, "Cyanoacrylate Adhesives" in Handbook of Adhesives, 27, 463-77, I. Skeist, ed., Van Nostrand Reinhold, New York, 3rd ed. (1990).
G.H. Millet, "Cyanoacrylate Adhesives" in Structural Adhesives: Chemistry and Technology, S.R. Hartshorn, ed., Plenum Press, New York, p. 249-307 (1986).
Nie Cong et al., "Study on humidity-heat aging resistance of a-cyanoacrylate adhesives", vol. 1, pp. 9-11 (2013).
Li Hongqiang edited, "Principle Technology and Application of Adhesion", South China University of Technology Press, pp. 130.
D.L. Kotzev etal., Assessment of the Adhesive Bond Properties of Allyl 2-Cyanoacrylate, Journal of Applied Polymer Science, vol. 26.
Huang Farong et al., "Plastic Industry Handbook—Unsaturated Polyester Resin", Chemical Industry Press, pp. 50, 1st edition, Mar. 2001.

\* cited by examiner

*Primary Examiner* — Michael Bernshteyn
(74) *Attorney, Agent, or Firm* — Steven C. Bauman

(57) ABSTRACT

Cyanoacrylate compositions that include a cyanoacrylate component, a rubber toughening component, a component containing at least two (meth)acrylate functional groups and an anhydride component are provided.

23 Claims, 10 Drawing Sheets

CYANOACRYLATE COMPOSITIONS

BACKGROUND

Field

This invention relates to cyanoacrylate-containing compositions, which when cured provide improved humidity and thermal resistance.

Brief Description of Related Technology

Cyanoacrylate adhesive compositions are well known, and widely used as quick setting, instant adhesives with a wide variety of uses. See H. V. Coover, D. W. Dreifus and J. T. O'Connor, "Cyanoacrylate Adhesives" in *Handbook of Adhesives*, 27, 463-77, I. Skeist, ed., Van Nostrand Reinhold, New York, 3rd ed. (1990). See also G. H. Millet, "Cyanoacrylate Adhesives" in *Structural Adhesives: Chemistry and Technology*, S. R. Hartshorn, ed., Plenum Press, New York, p. 249-307 (1986).

In the past, efforts have been made to improve the heat resistance of cured products of cyanoacrylate composition, particularly upon exposure to elevated temperature conditions, such as 120° C., 150° C. and 180° C. As the cured products are thermoplastic in nature they tend to soften as the temperature increases and when the $T_g$ of the material is surpassed the cured product begins to flow. As the temperature increase progresses, a degradation begins and the physical properties deteriorate. As a result, commercial applications for cyanoacrylates where exposure to elevated temperature conditions is likely have proven tricky and consequently have been limited.

Attempts to remedy this situation have been undertaken in the past.

Thermal resistance conferring agents are known for use in cyanoacrylates.

For instance, U.S. Pat. No. 5,328,944 (Attarwala) (improved cyanoacrylate monomer adhesive formulations where the formulation includes an effective amount for enhancing the thermal resistance of the cured polymer of sulfur containing compounds of a specified the formula, including anhydrosulfites, sulfoxides, sulfites, sulfonates, methanesulfonates, p-toluenesulfonates, sulfinates, and cyclic sulfinates); U.S. Pat. No. 5,288,794 (Attarwala) (improved cyanoacrylate monomer adhesive formulations where the formulation includes an effective amount for enhancing the thermal resistance of the cured polymer of a mono, poly or hetero aromatic compound characterized by at least three substitutions on an aromatic ring thereof, two or more of the substitutions being electron withdrawing groups, examples of which aromatic compounds being 2,4-dinitrofluorobenzene, 2,4-dinitrochlorobenzene, 2,4-difluoronitrobenzene, 3,5-dinitrobenzonitrile, 2-chloro-3,5-dinitrobenzonitrile, 4,4'-difluoro-3,3'-dinitrophenyl sulfone, pentafluoronitrobenzone; pentafluorobenzonitrile, α,α,α-2-tetrafluoro-p-toluinitrile and tetrachloroterphthalonitrile); and U.S. Pat. No. 5,424,343 (Attarwala) (cyanoacrylate monomer adhesive formulations, curable to a polymer, comprising a cyanoacrylate monomer and an effective amount, for enhancing the thermal resistance of the cured polymer, of a naphthosultone compound substituted with at least one strong electron withdrawing group at least as strongly electron withdrawing as nitro) are a few examples. See also U.S. Pat. No. 5,536,799 and Japanese Patent Document No. JP H06-145606.

The use of carboxylic acids and their anhydrides in cyanoacrylate compositions to improve thermal and moisture resistance is known.

For instance, U.S. Pat. No. 3,832,334 is directed to the addition of maleic anhydride, which is reported to produce cyanoacrylate adhesives having increased thermal resistance (when cured) while preserving fast cure speed.

U.S. Pat. No. 4,196,271 is directed to tri-, tetra- and higher carboxylic acids or their anhydrides, which are reported to be useful for improving heat resistance of cured cyanoacrylate adhesives.

U.S. Pat. No. 4,450,265 is directed to the use of phthalic anhydride to improve heat resistance of cyanoacrylate adhesives. More specifically, the '265 patent is directed to and claims an adhesive composition comprising a polymerizable constituent the major part of which comprises at least one ester of 2-cyanoacrylic acid, characterized in that the composition additionally comprises a proportion of phthalic anhydride effective for favorably influencing the strength and/or durability of adhesive bonds formed from the composition, under exposure to moisture or elevated temperature. The effective amount is reported as 0.1% to 5.0%, such as 0.3% to 0.7%, by weight of the composition. The '265 patent reports the superiority of phthalic anhydride over compositions where no additive was used, and where maleic anhydride was used (though less pronounced in the case of stainless steel lap shears than in those of aluminium).

U.S. Pat. No. 4,532,293 is directed to the use of benzophenonetetracarboxylic acid or its anhydride to provide a superior heat resistance for cyanoacrylate adhesives.

Rubber toughened cyanoacrylates are known.

For instance, U.S. Pat. No. 4,440,910 (O'Connor) pioneered rubber toughened cyanoacrylate compositions through the use of certain organic polymers as toughening additives that are elastomeric, i.e., rubbery, in nature. The '910 patent is thus directed to and claims a curable adhesive comprising a substantially solvent-free mixture of: (a) a cyanoacrylate ester, and (b) about 0.5% to about 20% by weight of an elastomeric polymer. The elastomeric polymer is selected from elastomeric copolymers of a lower alkene monomer and (i) acrylic acid esters, (ii) methacrylic acid esters or (iii) vinyl acetate. More specifically, the '910 patent notes that as toughening additives for cyanoacrylates, acrylic rubbers; polyester urethanes; ethylene-vinyl acetates; fluorinated rubbers; isoprene-acrylonitrile polymers; chlorosulfinated polyethylenes; and homopolymers of polyvinyl acetate were found to be particularly useful.

The elastomeric polymers are described in the '910 patent as either homopolymers of alkyl esters of acrylic acid; copolymers of another polymerizable monomer, such as lower alkenes, with an alkyl or alkoxy ester of acrylic acid; and copolymers of alkyl or alkoxy esters of acrylic acid. Other unsaturated monomers which may be copolymerized with the alkyl and alkoxy esters of acrylic include dienes, reactive halogen-containing unsaturated compounds and other acrylic monomers such as acrylamides. One group of elastomeric polymers are copolymers of methyl acrylate and ethylene, manufactured by DuPont, under the name of VAMAC, such as VAMAC N123 and VAMAC B-124. VAMAC N123 and VAMAC B-124 are reported by DuPont to be a master batch of ethylene/acrylic elastomer.

Henkel Corporation (as the successor to Loctite Corporation) has sold for a number of years since the filing of the '910 patent, rubber toughened cyanoacrylate adhesive products under the trade name BLACK MAX, which employ as the rubber toughening component, the DuPont materials called VAMAC B-124 and N123. In addition, Henkel has sold in the past clear and substantially colorless rubber toughened cyanoacrylate adhesive products, namely, LOCTITE 4203, 4204 and 4205, which employ as the rubber toughening component, the DuPont material, VAMAC G.

U.S. Patent Application Publication No. 2008-0314519 (Attarwala) is directed to an improvement of this rubber toughened cyanoacrylate adhesive technology, more specifically, where the rubber toughening agent consists essentially of (a) reaction products of the combination of ethylene, methyl acrylate and monomers having carboxylic acid cure sites, (b) dipolymers of ethylene and methyl acrylate, and combinations of (a) and (b), and being substantially free of release agents, anti-oxidants, stearic acid and/or polyethylene glycol ether wax.

U.S. Pat. No. 5,536,799 (Takahashi) speaks to the use of dipentaerythritol esters in cyanoacrylates to improve heat aging. Preferred esters are noted to be dipentaerythritoltriacrylate (available from Nippon Kayaku Co., Ltd. as KAYARAD D-330), dipentaerythritoltetraacrylate (available from Nippon Kayaku Co., Ltd. as KAYARAD D-320), dipentaerythritolpentaacrylate (available from Nippon Kayaku Co., Ltd. as KAYARAD D-310) and dipentaerythritolhexaacrylate (available from Nippon Kayaku Co., Ltd. as KAYARAD DPHA). The object of this technology seems to be to bond flexible substrates, which without a more flexible cyanoacrylate adhesive to bond the substrates, would otherwise cause the cyanoacrylate adhesive to crack. The noted substrates to be bonded are chloroprene rubber, EPDM and other synthetic rubbers and Bakelite.

Recently, the Henkel Adhesive Technologies business invented two technologies to address these desires. One is directed to cyanoacrylate adhesive compositions, comprising: (a) a mono-functional cyanoacrylate component (such as allyl-2-cyanoacrylate), and (b) a multi-functional cyanoacrylate component (such as bis-cyanoacrylate). The other is directed to cyanoacrylate-containing compositions that include, in addition to the cyanoacrylate component, a hydrogenated phthalic anhydride and optionally a benzonitrile. See U.S. patent Application Publication No. 20140124137.

Despite these efforts, there has been a long standing desire to achieve more robust thermal and humidity performance from cyanoacrylate compositions. It would accordingly be quite advantageous to provide another solution to that desire.

SUMMARY

The present invention is such a solution by providing a cyanoacrylate composition, which when cured provides improved thermal and humidity performance, through broadly speaking the combination of (a) a cyanoacrylate component, (b) a rubber toughening agent comprised of (i) reaction products of the combination of ethylene, methyl acrylate and monomers having carboxylic acid cure sites, (ii) dipolymers of ethylene and methyl acrylate, and combinations of (i) and (ii), (c) a component containing at least two (meth)acrylate functional groups, and (d) an anhydride component.

This invention is also directed to a method of bonding together two substrates, which method includes applying to at least one of the substrates a composition as described above, and thereafter mating together the substrates.

In addition, the present invention is directed to reaction products of the inventive compositions.

Also, the invention is directed to a method of preparing the inventive compositions.

The invention will be more fully understood by a reading of the section entitled "Detailed Description", which follows.

DETAILED DESCRIPTION

Figure 1:
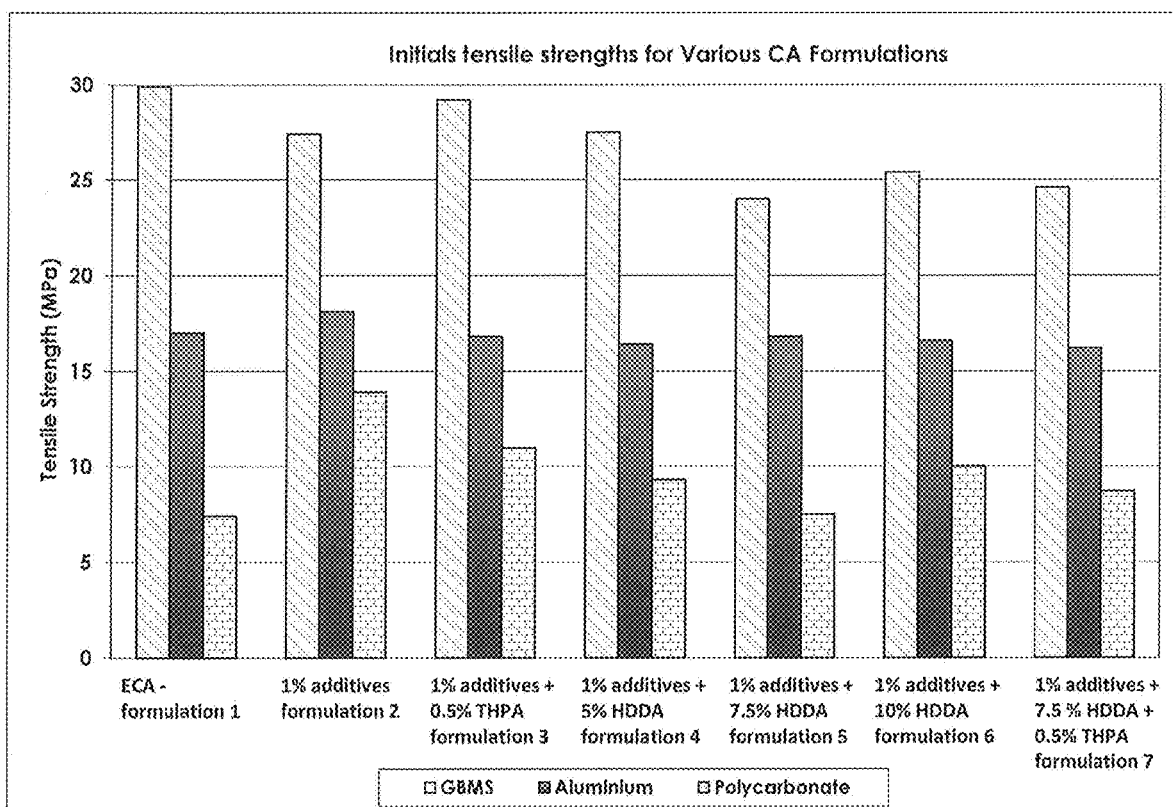
FIG. 1 shows initial tensile strengths for cyanoacrylate formulations 1 to 7 for grit blasted mild steel (GBMS), aluminium, and polycarbonate substrates.

As noted above, this invention is directed to cyanoacrylate compositions, which when cured provide improved thermal and humidity performance.

More specifically, the cyanoacrylate composition includes:

(a) a cyanoacrylate component, (b) a rubber toughening agent comprised of (i) reaction products of the combination of ethylene, methyl acrylate and monomers having carboxylic acid cure sites, (ii) dipolymers of ethylene and methyl acrylate, and combinations of (i) and (ii), (c) a component containing at least two (meth)acrylate functional groups, and (d) an anhydride component.

The cyanoacrylate component includes at least one cyanoacrylate monomer which may be chosen with a raft of substituents, such as those represented by $H_2C=C(CN)-COOR$, where R is selected from $C_{1-15}$ alkyl, $C_{2-15}$ alkoxyalkyl, $C_{3-15}$ cycloalkyl, $C_{2-15}$ alkenyl, $C_{6-15}$ aralkyl, $C_{5-15}$ aryl, $C_{2-15}$ allyl and haloalkyl groups. Desirably, the cyanoacrylate monomer is selected from at least one of methyl cyanoacrylate, ethyl-2-cyanoacrylate, propyl cyanoacrylates, butyl cyanoacrylates (such as n-butyl-2-cyanoacrylate), octyl cyanoacrylates, allyl cyanoacrylate, ß-methoxyethyl cyanoacrylate and combinations thereof. A particularly desirable cyanoacrylate monomer includes ethyl-2-cyanoacrylate.

The cyanoacrylate component should be included in the compositions in an amount within the range of from about 50% to about 99.98% by weight, with the range of about 70% to about 85% by weight, of the total composition being desirable.

The rubber toughening component may be chosen from one of several possibilities. One such possibility is a reaction product of the combination of ethylene, methyl acrylate and monomers having carboxylic acid cure sites. For example, the rubber toughening component may be an ethylene acrylic acid elastomer such as those available from Dupont™ under the trade name Vamac, such as VAMAC N123 and VAMAC B-124. VAMAC N123 and VAMAC B-124 are reported by DuPont to be a master batch of ethylene/acrylic elastomer. The DuPont material VAMAC G is a similar copolymer, but contains no fillers to provide colour or stabilizers. VAMAC VCS rubber appears to be the base rubber, from which the remaining members of the VAMAC product line are compounded. VAMAC VCS (also known as VAMAC MR) is a reaction product of the combination of ethylene, methyl acrylate and monomers having carboxylic acid cure sites, which once formed is then substantially free of processing aids such as the release agents octadecyl amine, complex organic phosphate esters and/or stearic acid, and anti-oxidants, such as substituted diphenyl amine.

Recently, DuPont has provided to the market under the trade designation VAMAC VMX 1012 and VCD 6200, which are rubbers made from ethylene and methyl acrylate. It is believed that the VAMAC VMX 1012 rubber possesses little to no carboxylic acid in the polymer backbone. Like the VAMAC VCS rubber, the VAMAC VMX 1012 and VCD 6200 rubbers are substantially free of processing aids such as the release agents octadecyl amine, complex organic phosphate esters and/or stearic acid, and anti-oxidants, such as substituted diphenyl amine, noted above. All of these VAMAC elastomeric polymers are useful herein.

In one variation, the so-formed reaction product is rendered substantially free of processing aids and anti-oxidants. The processing aids are release agents such as octadecyl amine (reported by DuPont™ to be available commercially from Akzo Nobel under the trade name ARMEEN 18D), complex organic phosphate esters (reported by DuPont to be available commercially from R.T. Vanderbilt Co., Inc. under the trade name VANFRE VAM), stearic acid and/or polyethylene glycol ether wax. The anti-oxidant is a substituted diphenyl amine (reported by DuPont to be available commercially from Uniroyal Chemical under the trade name NAUGARD 445).

Alternatively, the rubber toughening component is a dipolymer of ethylene and methyl acrylate. In one variation of this alternative, the so-formed dipolymer is rendered substantially free of processing aids and anti-oxidants. Of course, the rubber toughening agent may be a combination of the reaction product of the preceding paragraph and the dipolymer of this paragraph, either of which or both may be rendered substantially free of processing aids and anti-oxidants.

The rubber toughening component should be present in a concentration of about 1.5% to about 20% by weight, such as about 5% to about 15% by weight, with about 8% to about 10% being particularly desirable.

The component containing at least two (meth)acrylate functional groups should be an aliphatic compound having at least two (meth)acrylate functional groups, preferably at the terminal ends of the aliphatic chain, though pendant along the aliphatic chain is appropriate as well, particularly where more than two (meth)acrylate functional groups are present. Alkane di- and tri-ol di- and tri-(meth)acrylates, respectively, are a few examples of such compounds. More specifically, hexanediol dimethacrylate and hexanediol diacrylate are desirable. In addition, di-trimethylolpropane tetraacrylate and trimethylolpropane trimethacrylate are also desirable.

For example the component containing at least two (meth)acrylate functional groups may have the following formula:

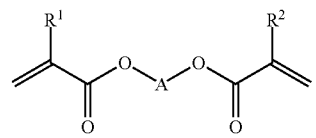

Wherein A is a $C_4$ to $C_{30}$ aliphatic chain which can optionally comprise heteroatoms selected from the group consisting of O, N and S, and wherein said chain is optionally substituted with one or more acrylate and/or methacrylate functional groups, and/or one or more $C_1$-$C_{10}$ alkyl groups; and wherein $R^1$ and $R^2$ may be the same or different and are each optionally selected from the group consisting of H and $C_1$ to $C_6$ alkyl.

Suitably the component having at least two (meth)acrylate functional groups has the formula:

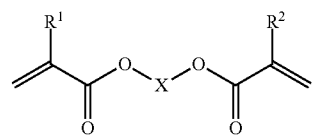

Wherein $R^1$ and $R^2$ are the same or different and are selected from the group consisting of H or Me; and wherein X is a C4 to C30 alkyl chain which can optionally comprise heteroatoms selected from the group consisting of O, N and S and wherein said chain is optionally substituted with one or more acrylate and/or methacrylate functional groups, and/or one or more $C_1$-$C_{10}$ alkyl groups.

X may be a $C_4$ to $C_{30}$ alkyl chain, for example X may be a $C_4$ alkyl chain, or a $C_5$ alkyl chain, or a $C_6$ alkyl chain, or a $C_7$ alkyl chain, or a $C_8$ alkyl chain, or a $C_9$ alkyl chain, or a $C_{10}$ alkyl chain, or a $C_{11}$ alkyl chain, or a $C_{12}$ alkyl chain.

The component having at least two (meth) acrylate functional groups may be selected from the group consisting of:

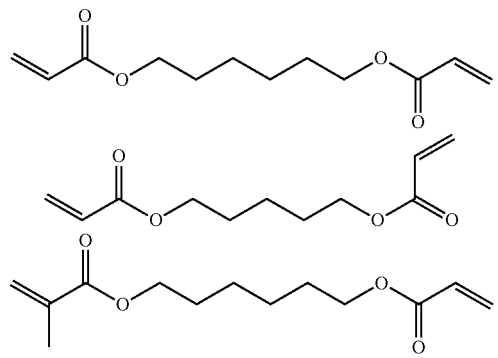

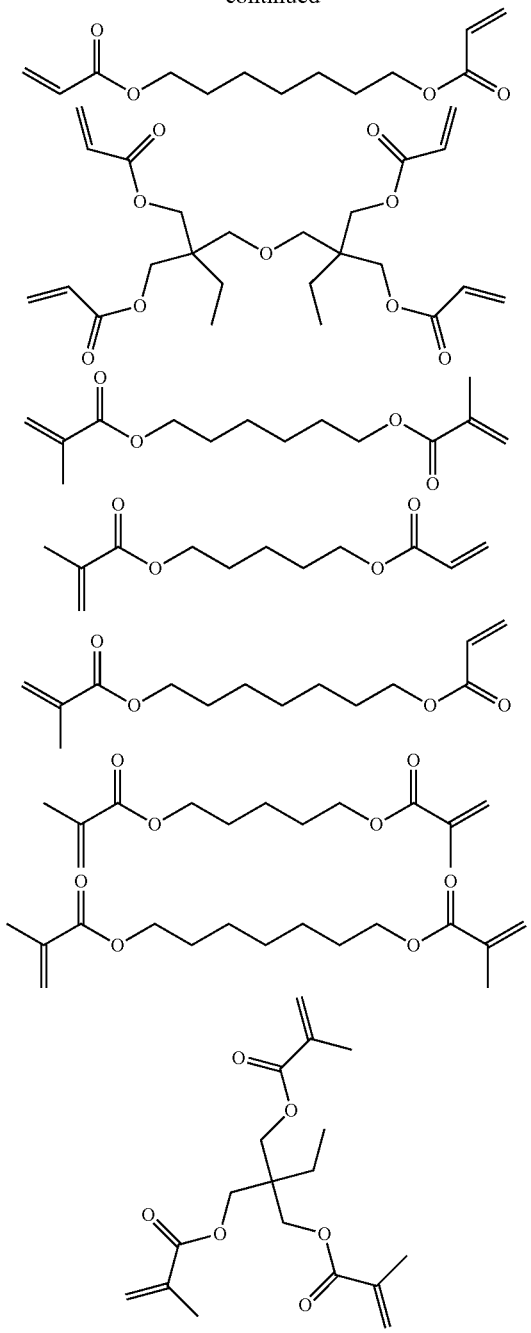

The component containing at least two (meth)acrylate functional groups should be present in a concentration of about 0.5% to about 20% by weight, such as about 1% to about 15% by weight, with about 5% to about 10% being particularly desirable.

The anhydride component should be an aromatic one like phthalic anhydride or full or partially hydrogenated versions thereof, though other anhydrides may be used with or without phthalic anhydride (or its full or partially hydrogenated versions thereof).

The anhydride component should be present in a concentration of about 0.05% to about 5% by weight, such as about 0.1% to about 1% by weight, with about 0.5% being particularly desirable.

Thermal resistance conferring agents may also be added. Included among such agents are certain sulfur-containing compounds, such as sulfonates, sulfinates, sulfates and sulfites as set forth in U.S. Pat. No. 5,328,944 (Attarwala), the disclosure of which is hereby expressly incorporated herein by reference.

For example, compositions of the invention may optionally comprise additives which confer thermal resistance properties such as 2-sulfobenzoic acid anhydride, triethylene glycol di(p-toulene sulfonate), trifluoroethyl p-toluene sulfonate, dimethyl dioxolen-4-ylmethyl p-toluene sulfonate, p-toulene sulfonic anhydride, methanesulfonic anhydride, 1,3 propylene sulfite, dioxathiolene dioxide, 1,8-naphthosultone, sultone 1,3-propane, sultone 1,4-butene, allyl phenyl sulfone, 4-fluorophenyl sulfone, dibenzothiophene sulfone, bis(4-fluorophenyl) sulfone, ethyl p-toluenesulfonate, trifluoromethanesulfonic anhydride.

Accelerators may be included in the inventive cyanoacrylate compositions, such as any one or more selected from calixarenes and oxacalixarenes, silacrowns, crown ethers, cyclodextrins, poly(ethyleneglycol) di(meth)acrylates, ethoxylated hydric compounds and combinations thereof.

Of the calixarenes and oxacalixarenes, many are known, and are reported in the patent literature. See e.g. U.S. Pat. Nos. 4,556,700, 4,622,414, 4,636,539, 4,695,615, 4,718,966, and 4,855,461, the disclosures of each of which are hereby expressly incorporated herein by reference.

For instance, as regards calixarenes, those within the following structure are useful herein:

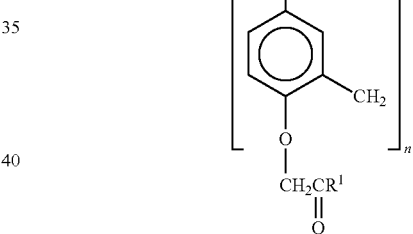

where $R^1$ is alkyl, alkoxy, substituted alkyl or substituted alkoxy; $R^2$ is H or alkyl; and n is 4, 6 or 8.

One particularly desirable calixarene is tetrabutyl tetra[2-ethoxy-2-oxoethoxy]calix-4-arene.

A host of crown ethers are known. For instance, examples which may be used herein either individually or in combination, or in combination with other first accelerator

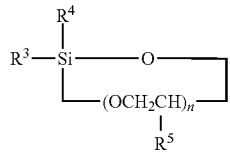

include 15-crown-5, 18-crown-6, dibenzo-18-crown-6, benzo-15-crown-5-dibenzo-24-crown-8, dibenzo-30-crown-10, tribenzo-18-crown-6, asym-dibenzo-22-crown-6, dibenzo-14-crown-4, dicyclohexyl-18-crown-6, dicyclohexyl-24-crown-8, cyclohexyl-12-crown-4, 1,2-decalyl-15-crown-5, 1,2-naphtho-15-crown-5, 3,4,5-naphtyl-16-crown-5, 1,2-methyl-benzo-18-crown-6, 1,2-methylbenzo-5, 6-methylbenzo-18-crown-6, 1,2-t-butyl-18-crown-6, 1,2-vinylbenzo-15-crown-5, 1,2-vinylbenzo-18-crown-6, 1,2-t-butyl-cyclohexyl-18-crown-6, asym-dibenzo-22-crown-6 and 1,2-benzo-1,4-benzo-5-oxygen-20-crown-7. See U.S. Pat. No. 4,837,260 (Sato), the disclosure of which is hereby expressly incorporated here by reference.

Of the silacrowns, again many are known, and are reported in the literature. For instance, a typical silacrown may be represented within the following structure:
where $R^3$ and $R^4$ are organo groups which do not themselves cause polymerization of the cyanoacrylate monomer, $R^5$ is H or $CH_3$ and n is an integer of between 1 and 4. Examples of suitable $R^3$ and $R^4$ groups are R groups, alkoxy groups, such as methoxy, and aryloxy groups, such as phenoxy. The $R^3$ and $R^4$ groups may contain halogen or other substituents, an example being trifluoropropyl. However, groups not suitable as $R^4$ and $R^5$ groups are basic groups, such as amino, substituted amino and alkylamino.

Specific examples of silacrown compounds useful in the inventive compositions include:

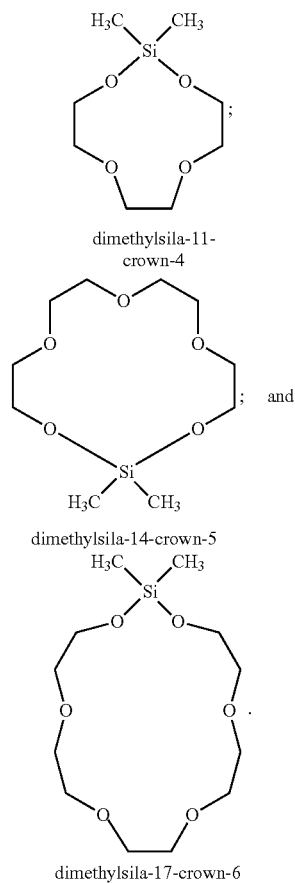

dimethylsila-11-crown-4

; and dimethylsila-14-crown-5 dimethylsila-17-crown-6

See e.g. U.S. Pat. No. 4,906,317 (Liu), the disclosure of which is hereby expressly incorporated herein by reference.

Many cyclodextrins may be used in connection with the present invention. For instance, those described and claimed in U.S. Pat. No. 5,312,864 (Wenz), the disclosure of which is expressly incorporated herein by reference, as hydroxyl group derivatives of an α, β or γ-cyclodextrin which is at least partly soluble in the cyanoacrylate would be appropriate choices.

For instance, poly(ethylene glycol) di(meth)acrylates suitable for use herein include those within the following structure:

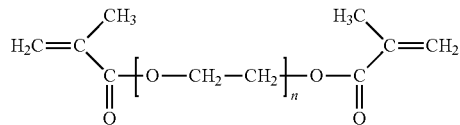

where n is greater than 3, such as within the range of 3 to 12, with n being 9 as particularly desirable. More specific examples include PEG 200 DMA, (where n is about 4) PEG 400 DMA (where n is about 9), PEG 600 DMA (where n is about 14), and PEG 800 DMA (where n is about 19), where the number (e.g., 400) represents the average molecular weight of the glycol portion of the molecule, excluding the two methacrylate groups, expressed as grams/mole (i.e., 400 g/mol). A particularly desirable PEG DMA is PEG 400 DMA.

And of the ethoxylated hydric compounds (or ethoxylated fatty alcohols that may be employed), appropriate ones may be chosen from those within the following structure:

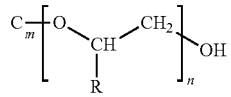

where $C_m$ can be a linear or branched alkyl or alkenyl chain, m is an integer between 1 to 30, such as from 5 to 20, n is an integer between 2 to 30, such as from 5 to 15, and R may be H or alkyl, such as $C_{1-6}$ alkyl.

Commercially available examples of materials within the above structure include those offered under the DEHYDOL tradename from BASF SE, Lugwigshafen, Germany.

When used, the accelerator embraced by the above structures should be included in the compositions in an amount within the range of from about 0.01% to about 10% by weight, with the range of about 0.1 to about 0.5% by weight being desirable, and about 0.4% by weight of the total composition being particularly desirable.

A stabilizer package is also ordinarily found in cyanoacrylate compositions. The stabilizer package may include one or more free radical stabilizers and anionic stabilizers, each of the identity and amount of which are well known to those of ordinary skill in the art. See e.g. U.S. Pat. Nos. 5,530,037 and 6,607,632, the disclosures of each of which are hereby incorporated herein by reference.

Commonly used free-radical stabilizers include hydroquinone, while commonly used anionic stabilizers include boron triflouride, boron trifluoride-etherate, sulphur trioxide (and hydrolyis products thereof), sulfur dioxide and methane sulfonic acid.

Other additives may be included to confer additional physical properties, such as improved shock resistance (for instance, citric acid), thickness (for instance, polymethyl methacrylate), thixotropy (for instance fumed silica), and color.

These other additives may be used in the inventive compositions individually in an amount from about 0.05% to about 20%, such as about 1% to 15%, desirably 5% to 10% by weight, depending of course on the identity of the additive. For instance, and more specifically, citric acid may be used in the inventive compositions in an amount of 5 to 500 ppm, desirably 10 to 100 ppm.

In another aspect, there is provided a method of bonding together two substrates, which method includes applying to at least one of the substrates a composition as described above, and thereafter mating together the substrates for a time sufficient to permit the adhesive to fixture. For many applications, the substrate should become fixed by the compositions in less than about 150 seconds, and depending on the substrate as little as about 30 seconds. In addition, the composition should develop shear strength on the substrates between which they have been applied, as well as side impact strength and fracture toughness.

In yet another aspect, there is provided reaction products of the so-described compositions.

In still another aspect, there is provided a method of preparing the so-described compositions. The method includes providing a cyanoacrylate component, an anhrydride component, a rubber toughening component, and a component containing at least two (meth)acrylate functional groups, and mixing to form the cyanoacrylate composition.

The present invention provides a cyanoacrylate composition, comprising:
(a) a cyanoacrylate component,
(b) a rubber toughening agent comprised of (i) reaction products of the combination of ethylene, methyl acrylate and monomers having carboxylic acid cure sites, (ii) dipolymers of ethylene and methyl acrylate, and combinations of (i) and (ii),
(c) a component containing at least two (meth)acrylate functional groups, and
(d) an anhydride component. Compositions of the invention are particularly suited to bonding steel substrates.

In one embodiment the cyanoacrylate component comprises ethyl-2-cyanoacrylate, which is present in an amount of from about 70% by weight of the total composition to about 98% by weight of the total composition, for example the ethyl-2-cyanoacrylate may be present in an amount of about 85% by weight of the total composition.

The component containing at least two (meth)acrylate functional groups may be 1,6-hexanediol diacrylate, and may be present in an amount of about 0.5% to about 10% by weight of the total composition. For example, the cyanoacyrlate composition of the invention may comprise from about 5% to about 10% by weight 1,6-hexanediol diacrylate.

The anhydride component may by tetrahydrophthalic anhydride and may be present in an amount of from about 0.1% to about 1% by weight of the total composition.

The composition may further comprise a stabiliser such as sulfur dioxide and methanesulfonic acid.

In one embodiment the cyanoacrylate component is ethyl-2-cyanoacryalte, the anhydride component is tetrahydrophthalic anhydride and the component containing at least two (meth)acrylate functional groups is 1,6-hexanediol diacrylate.

In one embodiment the cyanoacrylate component is present in an amount of about 80% to about 90% by weight, the rubber toughening agent is present in an amount of about 5% by weight to about 15% by weight, the component comprising at least two (meth)acrylate functional groups is present in an amount of about 0.5% to about 10% by weight and the anhydride component is present in an amount of about 0.1% to about 1% by weight of the total composition.

In a further embodiment the cyanoacrylate compositions of the invention further comprise additives for conferring thermal resistance. For example, the cyanoacrylate compositions of the invention may further comprise sulfur containing compounds such as ethylene sulphite or naphthosultone.

The additives for conferring thermal resistance may for example be present in an amount of from about 0.05% to about 5% by weight of the total composition, for example, sadi additives may be present in about 1% or about 2% by weight of the total composition.

The compositions of the invention may comprise naphthosultone. The compositions of the invention may comprise ethylene sulphite. The compositions of the invention may comprise one or more thermal resistance conferring additives. For example the compositions may comprise ethylene sulphite and naphthosultone.

Desirably, the compositions of the invention show enhanced thermal performance. Advantageously, the compositions of the invention when cured at room temperature between two substrates, each of which being constructed from steel, retain greater than about 40% of their initial tensile strength after exposure to a temperature of about 120° C. for a period of time of about 3 weeks.

Additionally, the compositions of the invention when cured at room temperature between two substrates, each of which being constructed from steel, advantageously retain greater than about 70% of their initial tensile strength after exposure to a temperature of about 40° C. at a relative humidity of about 98% for a period of time of about 3 weeks.

For example, the compositions of the invention when cured at room temperature between two substrates each of which being constructed from steel, advantageously retain greater than about 75%, of their initial tensile strength after exposure to a temperature of about 40° C. at a relative humidity of about 98% for a period of time of about 3 weeks.

The present invention provides
a cyanoacrylate composition, comprising:
(a) a cyanoacrylate component,
(b) a rubber toughening agent comprised of (i) reaction products of the combination of ethylene, methyl acrylate and monomers having carboxylic acid cure sites, (ii) dipolymers of ethylene and methyl acrylate, and combinations of (i) and (ii),
(c) a component containing at least two (meth)acrylate functional groups, and
(d) an anhydride component
wherein when cured at room temperature between two substrates each of which being constructed from steel, greater than about 75% of its initial tensile strength is retained after exposure to a temperature of about 40° C. at a relative humidity of about 98% and greater than about 40% of its initial tensile strength is retained after exposure to a temperature of about 120° C. for a period of time of about 3 weeks.

Providing cyanoacrylate compositions with enhanced thermal and humid ageing performance is a longstanding problem in the adhesives industry. The compositions of the invention provide a solution to this desire.

The present invention provides a method of bonding together two substrates, which method includes applying to at least one of the substrates a cyanoacrylate composition comprising:
(a) a cyanoacrylate component,
(b) a rubber toughening agent comprised of (i) reaction products of the combination of ethylene, methyl acrylate and monomers having carboxylic acid cure sites, (ii) dipolymers of ethylene and methyl acrylate, and combinations of (i) and (ii),
(c) a component containing at least two (meth)acrylate functional groups, and
(d) an anhydride component.

Suitably, at least one of the substrates is constructed from steel. Desirably, the bonds formed between two substrates by the composition of the invention when cured, demonstrate excellent thermal aging performance for example after exposure to elevated temperatures i.e. temperatures above room temperature even in high humidity conditions, such as in 98% relative humidity.

These aspects of the invention will be further illustrated by the examples which follow.

EXAMPLES

The effect of hexanediol diacrylate (HDDA), and various additives on the heat and humid aging of a cyanoacrylate adhesive composition was carried out.

HDDA was added at levels of between 5-10%, with tetrahydrophthalic anhydride (THPA) added to see if humid aging could be improved upon.

A fixture time study was carried out on the various formulations in Table 1. The addition of naphthosultone and Ethylene sulphite cause a slight retardation in fixture time (Table 1, Formulation 2) while all other formulations show equivalent or faster fixture times.

| CA composition with HDDA (wt %) | | | | | | | |
|---|---|---|---|---|---|---|---|
| Formulation | 1 | 2 | 3 | 4 | 5 | 6 | 7 |
| Ethyl CA, stabilizer, rubber toughening agent | 100 | 98 | 97.5 | 93 | 90.5 | 88 | 90 |
| Ethylene Sulphite | — | 1.0 | 1.0 | 1.0 | 1.0 | 1.0 | 1.0 |
| Naphthosultone | — | 1.0 | 1.0 | 1.0 | 1.0 | 1.0 | 1.0 |
| Tetrahydrophthalic anhydride | — | — | 0.5 | — | — | — | 0.5 |
| HDDA | — | — | — | 5.0 | 7.5 | 10.0 | 7.5 |
| Initials (Cure: 24 HR, RT, MPa) | | | | | | | |
| GBMS | 29.9 | 27.4 | 29.2 | 27.5 | 24 | 25.4 | 24.6 |
| Aluminium | 17 | 18.1 | 16.8 | 16.4 | 16.8 | 16.6 | 16.2 |
| Polycarbonate | 7.4 | 13.9 | 11 | 9.3 | 7.5 | 10 | 8.7 |
| Fixtures (seconds) | | | | | | | |
| Aluminium | 30-45 | 45-60 | 30-45 | 15-20 | 10-15 | 20-30 | 30-45 |
| 100° C. (MPa) | | | | | | | |
| 100° C. GBMS 3 Weeks | 8.7 | 11.4 | 11.1 | 19.1 | 17.1 | 19.0 | 18.1 |
| % Retention | 29 | 42 | 38 | 69 | 71 | 75 | 74 |
| 100° C. GBMS 6 Weeks | 8.0 | 12.1 | 11.3 | 14.9 | 12.3 | 11.8 | 19.2 |
| % Retention | 27 | 44 | 39 | 54 | 51 | 46 | 78 |
| 100° C. GBMS 12 Weeks | 6.7 | 10.9 | 11.1 | 11.2 | 11.3 | 11.4 | 16.2 |
| % Retention | 22 | 40 | 38 | 41 | 47 | 45 | 66 |
| 120° C. (MPa) | | | | | | | |
| 120° C. GBMS 3 Weeks | 5.5 | 13.2 | 12.6 | 12.0 | 14.1 | 10.8 | 10.7 |
| % Retention | 18 | 48 | 43 | 44 | 59 | 43 | 43 |
| 120° C. GBMS 6 Weeks | 3.5 | 11.2 | 11.5 | 10.6 | 9.4 | 8.5 | 11.3 |
| % Retention | 12 | 41 | 39 | 39 | 39 | 33 | 46 |
| 120° C. GBMS 12 Weeks | 0.5 | 6.4 | 5.5 | 6.1 | 3.9 | 5.8 | 4.2 |
| % Retention | 2 | 23 | 19 | 22 | 16 | 23 | 17 |
| 40° C./98% RH (MPa) | | | | | | | |
| 40° C./98% RH GBMS 3 Weeks | 9.9 | 9.5 | 15.9 | 8 | 8.1 | 8.5 | 18.9 |
| % Retention | 33 | 35 | 54 | 29 | 34 | 33 | 77 |
| 40° C./98% RH GBMS 6 Weeks | 10.0 | 8.3 | 12.3 | 8.5 | 9.4 | 10.5 | 18.0 |
| % Retention | 33 | 30 | 42 | 31 | 39 | 41 | 73 |
| 40° C./98% RH GBMS 12 Weeks | 10.2 | 8.5 | 8.1 | 7.1 | 7.6 | 7.7 | 14.8 |
| % Retention | 34 | 31 | 28 | 26 | 32 | 30 | 60 |

Formulation 1 is a standard flexible CA formulation which comprises:

Ethyl-2-cyanoacrylate, a rubber toughening agent comprised of (i) reaction products of the combination of ethylene, methyl acrylate and monomers having carboxylic acid cure sites, (ii) dipolymers of ethylene and methyl acrylate, and combinations of (i) and (ii), and a stabilizer. The rubber agent used in formulation 1 above is that provided under the trade name VAMAC VCS 5500. The stabilizer used in formulation 1 above is a combination of methane sulfonic acid and $SO_2$.

Formulations 2 to 7 comprise formulation 1 in the provided weight percent plus additional additives.

FIG. 1 shows initial tensile strengths for various CA formulations on GBMS, Aluminium and polycarbonate.

Tensile strengths were determined according to Henkel STM 700 for the determination of shear strength of adhesives using lap shear specimens.

Initial tensile strengths were generally similar to those for the control sample (formulation 1). The addition of ethylene sulphite and naphthosultone led to improved polycarbonate bonding while higher levels of HDDA led to a small drop in initial tensile strengths on GBMS.

Figure 2:
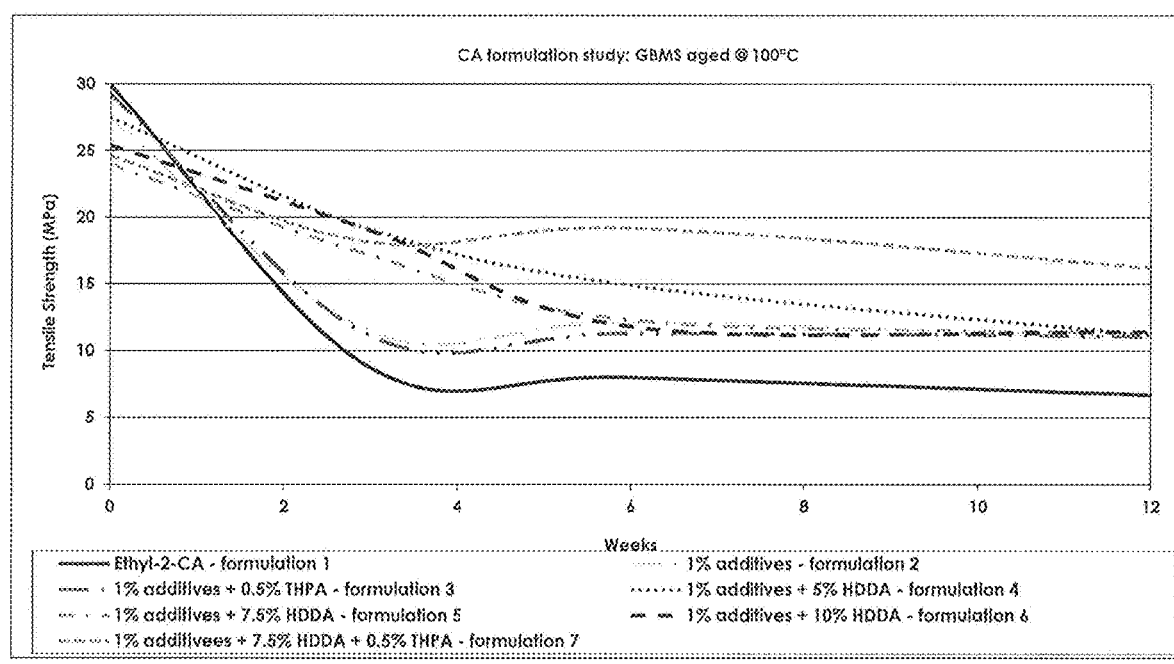
FIG. 2 shows the tensile strength performance of cyanoacrylate formulations 1 to 7 on GBMS after heat ageing at 100° C. over time.

FIG. 2 shows the tensile strengths for various cyanoacrylate formulations on GBMS aged at 100° C.

The benefits of adding ethylene sulphite and naphthosultone are clear. In the absence of additives the control sample, formulation 1, maintains about 22% of its initial tensile strength after 12 weeks, while formulations comprising a combination of ethylene sulphite and naphthosultone (formulations 2 and 3) maintain about 40% of their initial tensile strengths after 12 weeks.

The addition of 5% HDDA (formulation 4) shows excellent retention of around 55% after 1000 hours, however, this retention falls back to approximately 40% after 12 weeks; thus achieving similar tensile strength retention to that obtained for formulations 2 and 3.

The tensile strength of formulation 7 which comprises 7.5% HDDA, THPA, ethylene sulphite and naphthosultone was particularly high when determined on GBMS aged at 100° C.

Figure 3:
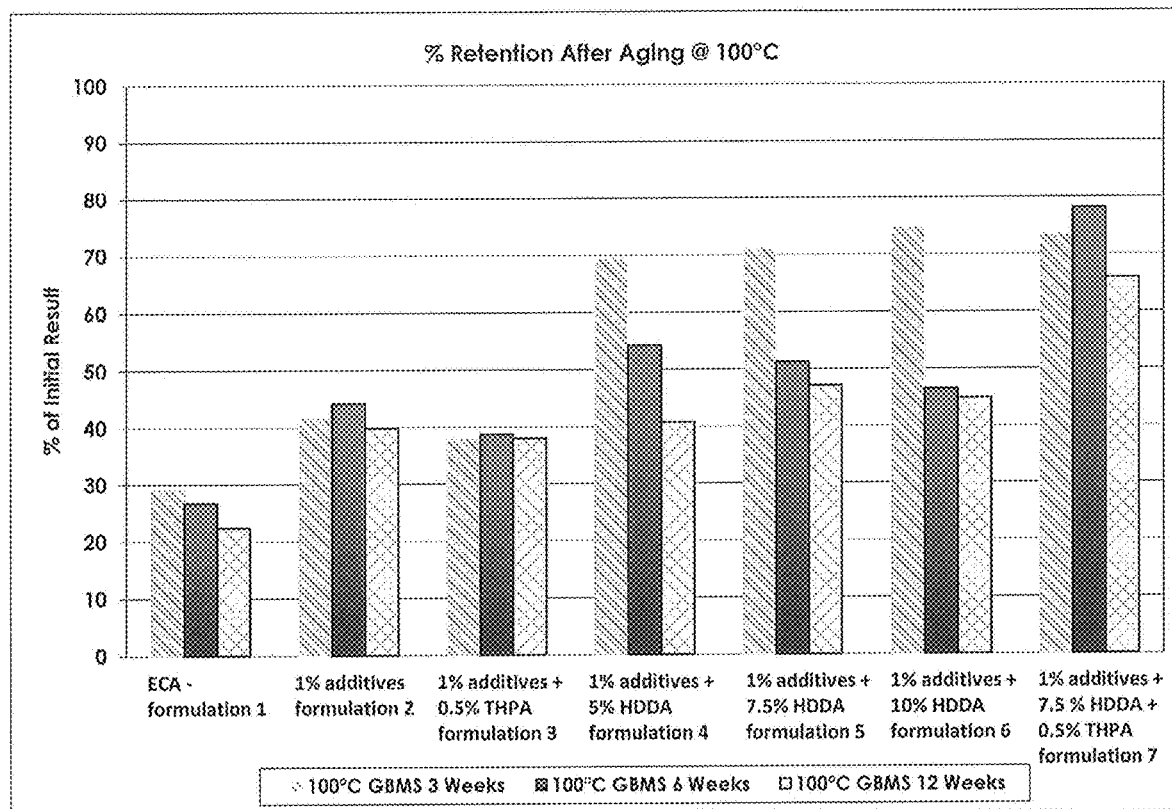
FIG. 3 shows the percentage retention of initial tensile strength of cyanoacrylate formulations 1 to 7 on GBMS after heat ageing at 100° C. for 3, 6 and 12 weeks.

FIG. 3 shows the percentage retention of initial tensile strength for formulations 1 to 7 when assessed on GBMS after heat ageing at 100° C. for periods of 3, 6 or 12 weeks.

After 1000 hours (6 weeks) formulation 7 maintains approximately 75% of its original tensile strength and impressively after 2000 hours (12 weeks) the formulation maintains approximately 65% of its original tensile strength.

Figure 4:
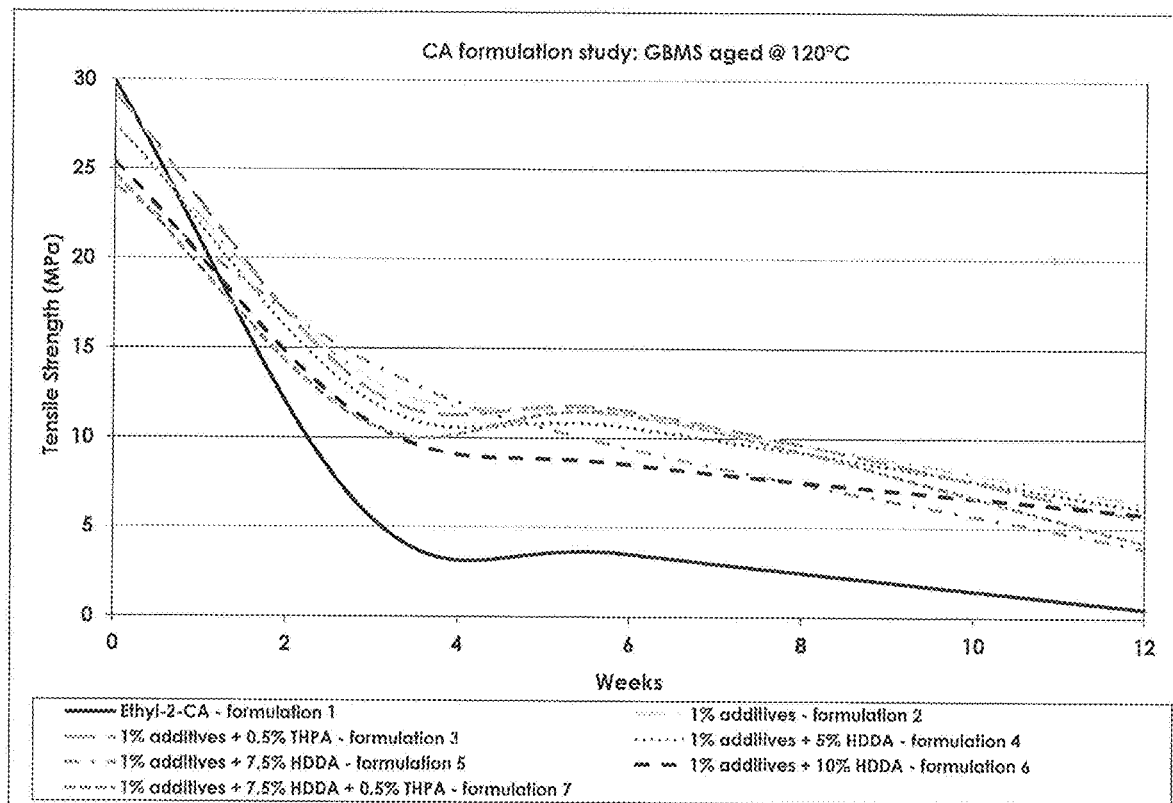
FIG. 4 shows the tensile strength performance of formulations 1 to 7 on GBMS after heat ageing at 120° C. over time.

FIG. 4 shows the tensile strengths for various cyanoacrylate formulations on GBMS aged at 120° C.

Figure 5:
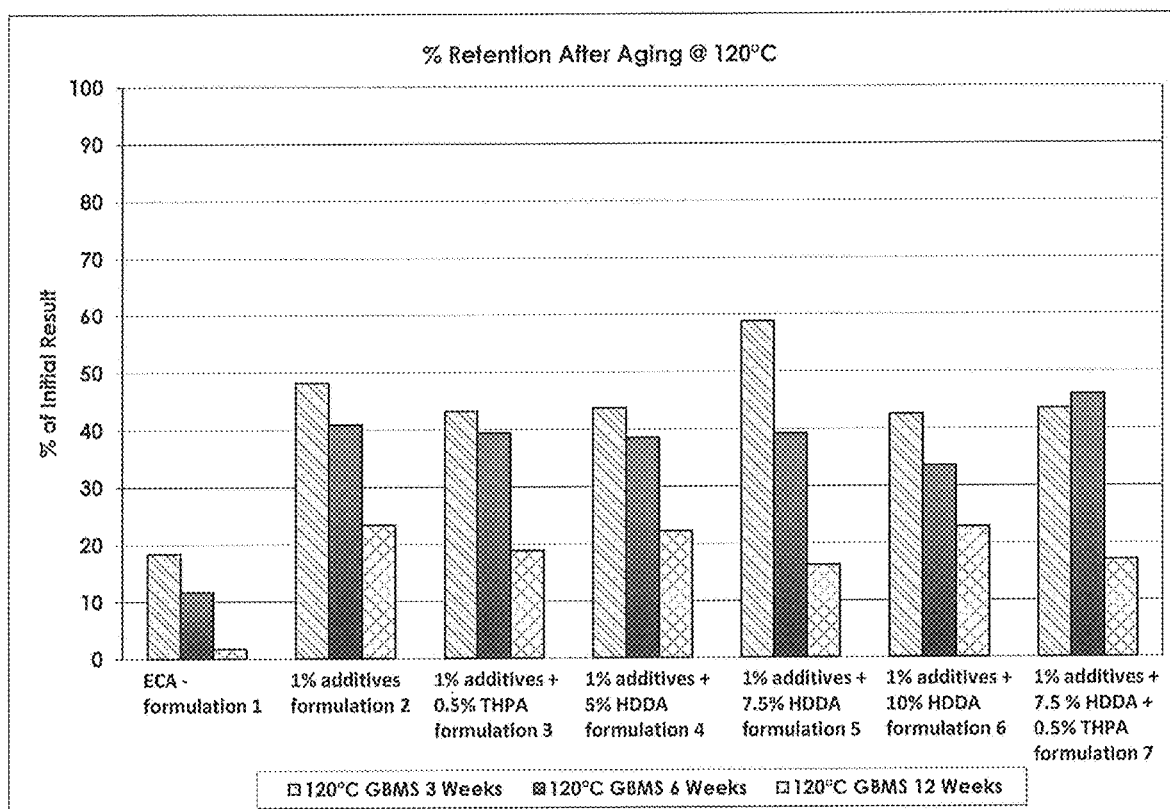
FIG. 5 shows the percentage retention of initial tensile strength of cyanoacrylate formulations 1 to 7 on GBMS after heat ageing at 120° C. for 3, 6 and 12 weeks.

FIG. 5 shows the percentage retention of initial tensile strength for formulations 1 to 7 when assessed on GBMS after heat ageing at 120° C. for periods of 3, 6 or 12 weeks.

Each of formulations 2 to 7 retained approximately 40% of initial tensile strength after 1000 hours, and approximately 20% of initial tensile strength after 2000 hours. In contrast formulation 1, which does not comprise any additives, retained 12% of initial tensile strength after 1000 hours and only 2% tensile strength after 2000 hours.

Advantageously, the additives present in formulations 2 to 7 significantly improve the percentage retention of initial tensile strength in comparison to the corresponding cyanoacrylate formulation absent said additives.

Figure 6:
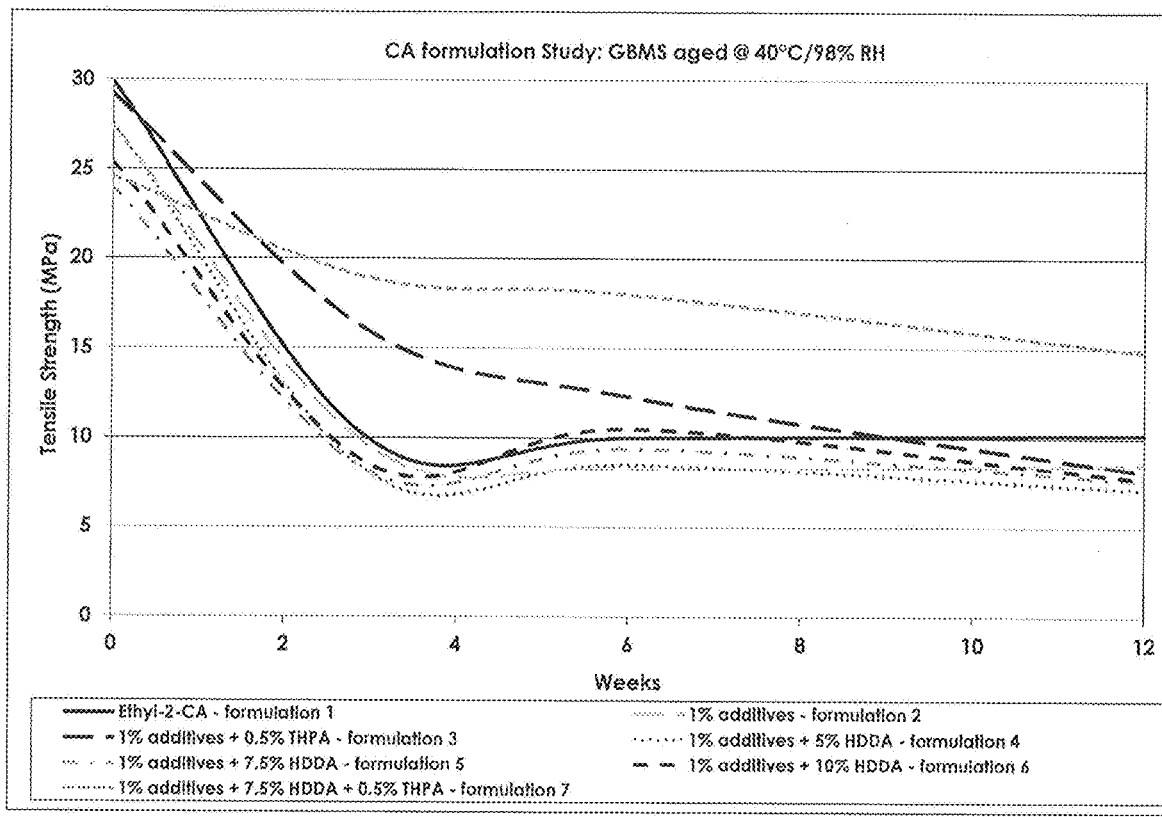
FIG. 6 shows the tensile strength performance of cyanoacrylate formulations 1 to 7 on GBMS after heat ageing at 40° C. in 98% relative humidity over time.

Formulations 1 to 7 were also assessed after humid ageing. The tensile strength for each formulation was determined on GBMS substrate after heat ageing at 40° C. at 98% relative humidity. The results for tensile strength assessment after heat ageing in humid conditions are shown in FIG. 6.

Formulations 3 and 7, both of which contain tetrahydrophthalic anhydride (THPA) showed good strength retention after 500 hours. Thereafter the tensile strength of formulation 3 (the formulation containing THPA alone) dropped off significantly, in comparison to the tensile strength of formulation 7.

Formulation 5, which comprises 7.5% hexandiol diacrylate retained 34% of initial tensile strength after 500 hours heat ageing at 40° C. at 98% relative humiditiy on GBMS substrate. This level of initial tensile strength was substantially retained after 2000 hours.

Figure 7:
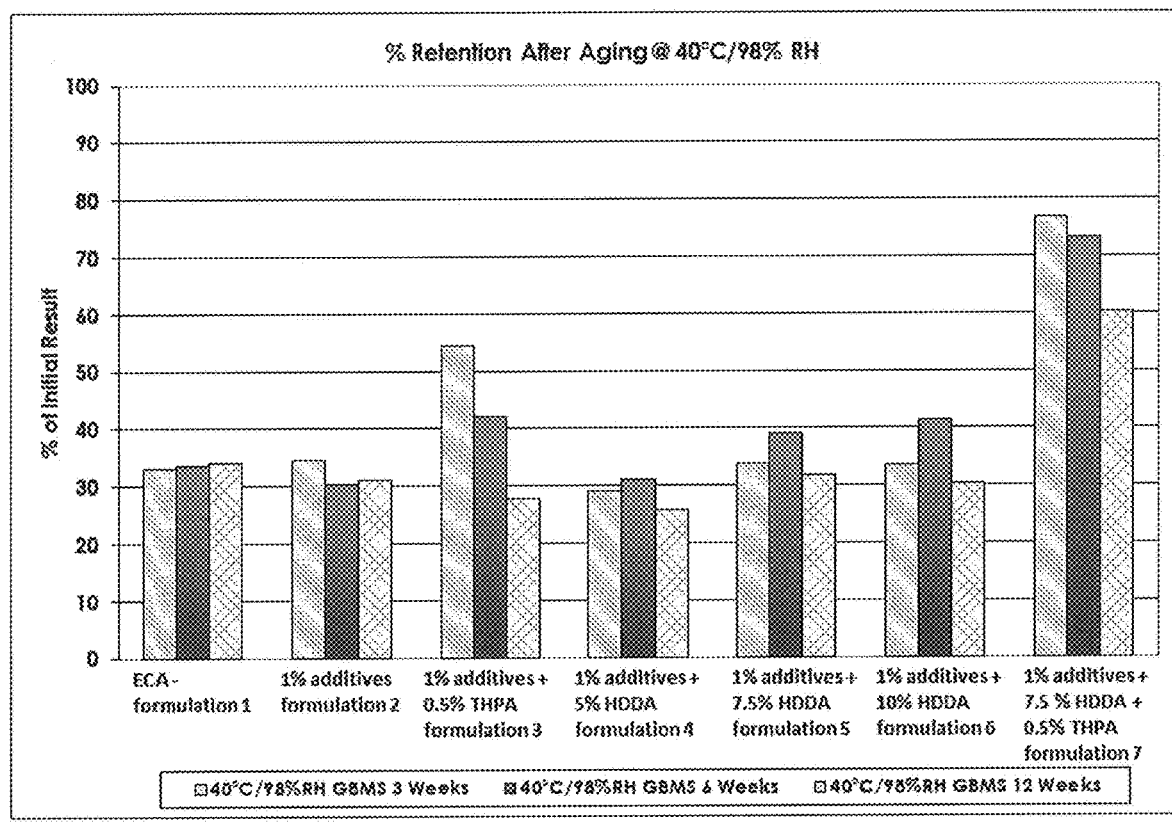
FIG. 7 shows the percentage retention of initial tensile strength for cyanoacrylate formulations 1 to 7 on GBMS after heat ageing at 40° C. in 98% relative humidity for 3, 6 and 12 weeks.

FIG. 7 shows the percentage of initial tensile strength retained for each of formulations 1 to 7 after heat ageing at 40° C. at 98% relative humiditiy on GBMS substrate.

Formulation 7 demonstrated approximately 75% of initial tensile strength retention at after 1000 hours, and approximately 60% of initial tensile strength retention after 2000 hours.

The combination of tetrahydrophthalic anhydride (THPA) and hexanediol diacrylate (HDDA) appear to have a synergistic effect when included as additives in the cyanoacrylate composition, as the tensile strength retention is substantially higher for formulation 7, which comprises both additives than it is for formulations 3 or 5, which comprise one but not both additives.

Advantageously formulation 7 retained approximately 60% of its initial tensile strength after 2000 hours. This level of initial tensile strength retention is considerably higher than that for the same duration for any of the formulations absent both THPA and HDDA. In fact, this level of retention is approximately double the value obtained for formulations 1 to 6 when tested under the same conditions.

A further study to investigate the humid ageing achieved with cyanoacrylate formulations comprising HDDA and THPA was subsequently carried out (see Table 2).

A number of formulations were prepared varying the levels of THPA, ethylene sulphite and naphthosultone in addition to examining the effect of varying levels of HDDA.

TABLE 2

| CA Composition with HDDA (wt %) | | | | | | | |
|---|---|---|---|---|---|---|---|
| Formulation | 8 | 9 | 10 | 11 | 12 | 13 | 14 |
| Ethyl CA, stabiliser and rubber toughening agent | 100.0 | 92.0 | 91.0 | 91.0 | 92.5 | 90.0 | 87.5 |
| Ethylene Sulphite | — | — | 1.0 | — | 1.0 | 1.0 | 1.0 |
| Naphtosultone | — | — | — | 1.0 | 1.0 | 1.0 | 1.0 |
| Tetrahydrophthalic Anhydride | — | 0.5 | 0.5 | 0.5 | 0.5 | 0.5 | 0.5 |
| 1,6-Hexanediol Diacrylate | — | 7.5 | 7.5 | 7.5 | 5.0 | 7.5 | 10.0 |
| Initials | | | | | | | |
| GBMS | 23.7 | 25.4 | 21.4 | 22.7 | 22.1 | 22.8 | 21.5 |
| Stainless Steel | 13.1 | 9.9 | 9.5 | 10.9 | 11.0 | 13.1 | 11.0 |
| 3 Weeks 40° C./98% RH | | | | | | | |
| GBMS | 9.3 | 19.6 | 20.6 | 17.3 | 19.8 | 19.2 | 19.0 |
| % Retention | 39 | 77 | 96 | 76 | 90 | 84 | 88 |
| 6 Weeks 40° C./98% RH | | | | | | | |
| GBMS | 9.1 | 19.3 | 16.0 | 19.4 | 19.6 | 17.2 | 19.2 |
| % Retention | 38 | 76 | 75 | 85 | 89 | 75 | 89 |
| Stainless Steel | 2.0 | 11.2 | 9.2 | 9.5 | 10.6 | 10.1 | 11.0 |
| % Retention | 15 | 113 | 97 | 87 | 96 | 77 | 100 |
| 12 Weeks 40° C./98% RH | | | | | | | |
| GBMS | 10.2 | 22.1 | 16 | 19.8 | 15.5 | 17.1 | 19.7 |
| % Retention | 43 | 87 | 75 | 87 | 70 | 75 | 92 |
| Stainless Steel | 2.8 | 9 | 9.9 | 9.8 | 6.5 | 9.6 | 11 |
| % Retention | 21 | 91 | 104 | 90 | 59 | 73 | 100 |
| 2 Weeks @ 65° C./9% RH | | | | | | | |
| GBMS | 7.7 | 20.9 | 9.3 | 19.7 | 12.6 | 13.4 | 17.6 |
| % Retention | 32 | 82 | 43 | 87 | 57 | 59 | 82 |
| 6 Weeks @ 65° C./95% RH | | | | | | | |
| GBMS | 7.1 | 15.8 | 4.9 | 18.9 | 3.5 | 4.3 | 6.8 |
| % Retention | 30 | 62 | 23 | 83 | 16 | 19 | 32 |

Formulations 9 to 14 comprise formulation 8 in the provided weight percent plus additional additives.

The initial tensile strength of each formulation on GBMS and stainless steel (SS) were studied.

Slight variation between corresponding formulations of table 1 and table 2 were observed however, the skilled person will appreciate that such variations are attributable to for example slight variation in lab conditions, age of adhesive and the specimens used.

Figure 8:
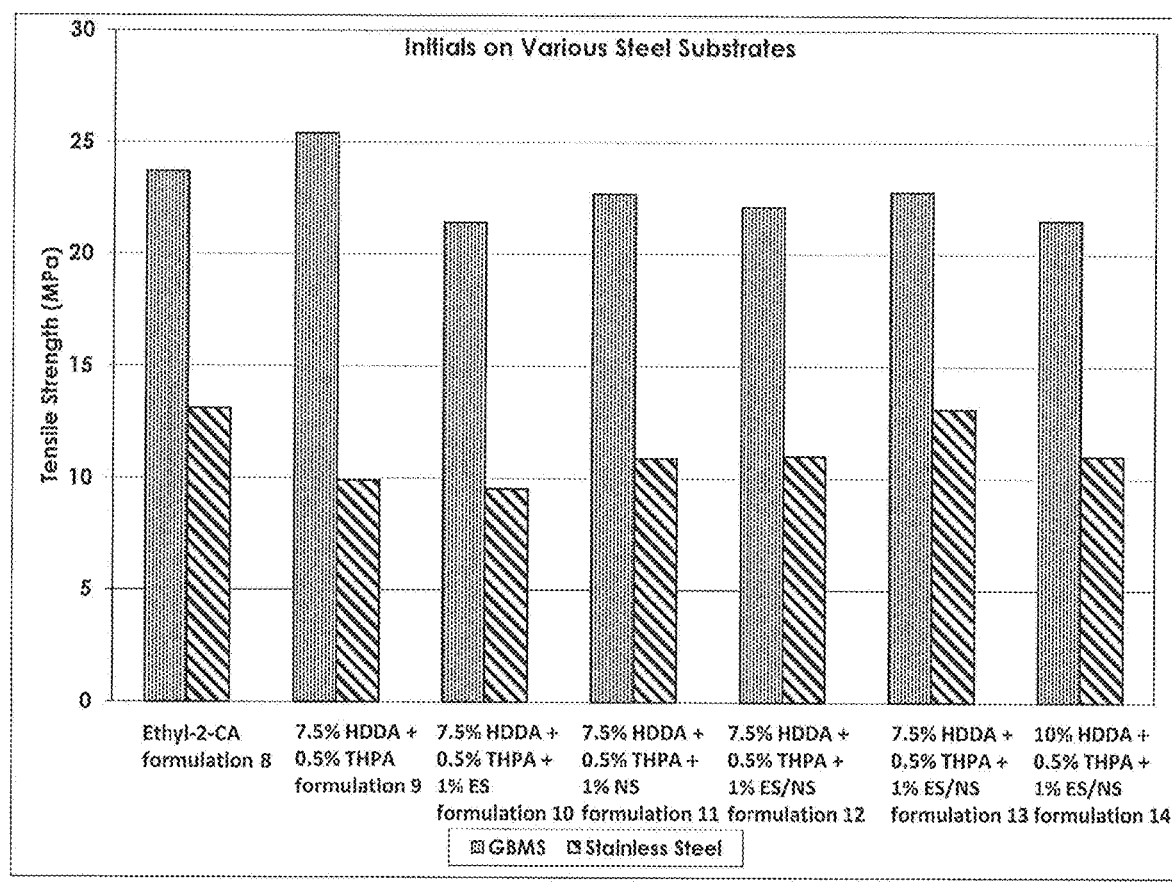
FIG. 8 shows the initial tensile strengths for cyanoacrylate formulations 8 to 14 on GBMS and stainless steel substrates.

In general, the initial tensile strengths for each formulation did not vary significantly for the different steel substrates, (see FIG. 8).

Figure 9:
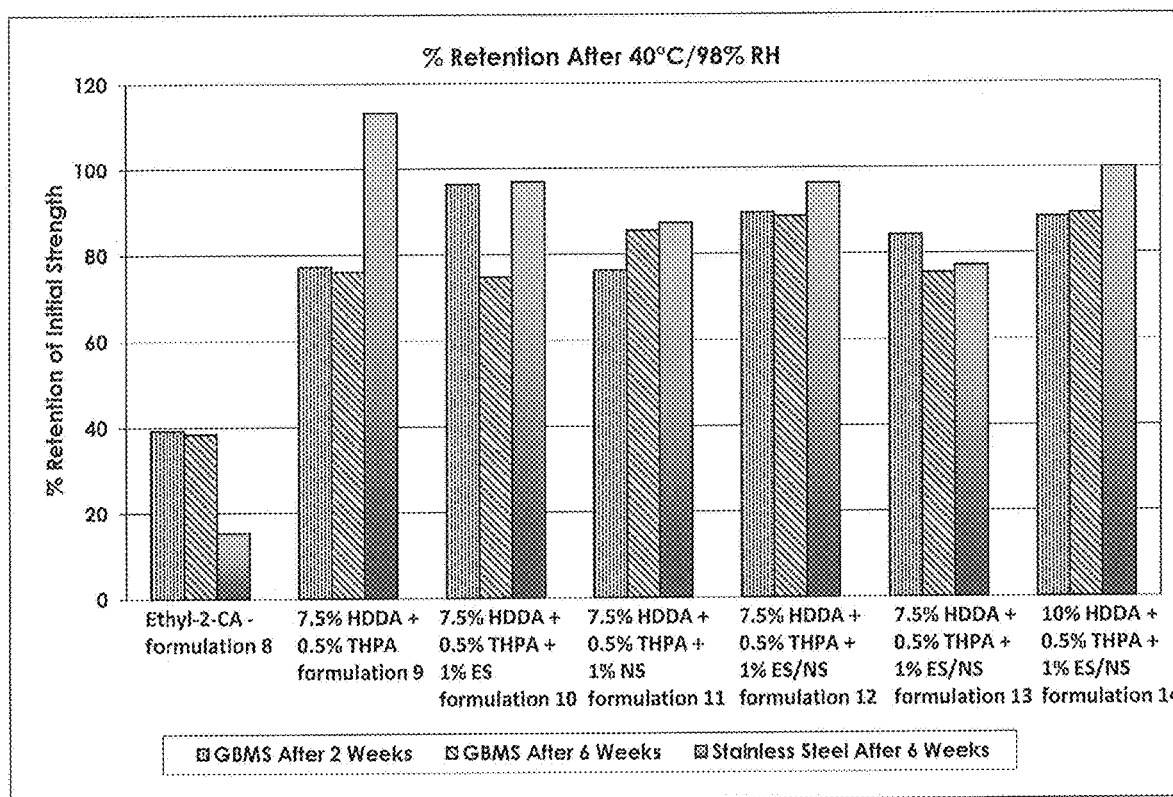
FIG. 9 shows the percentage retention of initial tensile strengths of cyanoacrylate formulations 8 to 14 on GBMS and stainless steel after heat ageing at 40° C. in 98% relative humidity.

FIG. 9 shows the percentage retention of initial tensile strength on GBMS and stainless steel for formulations 8-14 after heat ageing at 40° C. at 98% relative humidity.

Desirably, excellent humid ageing was observed on GBMS as well as on stainless steel substrates. Formulations 9-14 maintained about 80% of their initial strength after 1000 hours at 40° C. in 98% relative humidity on GBMS compared to formulation 8, which retained about 40% of initial tensile strength.

For stainless steel substrates, the percentage retention of initial tensile strength was even better, wherein the percentage retention for formulations 9-14 ranged from 75-115% of their initial value after 1000 hours at 40° C. in 98% relative humidity, in comparison to the control sample, formulation 8, which retained about 17% of the initial tensile strength value after the same heat and humidity exposure.

Figure 10:
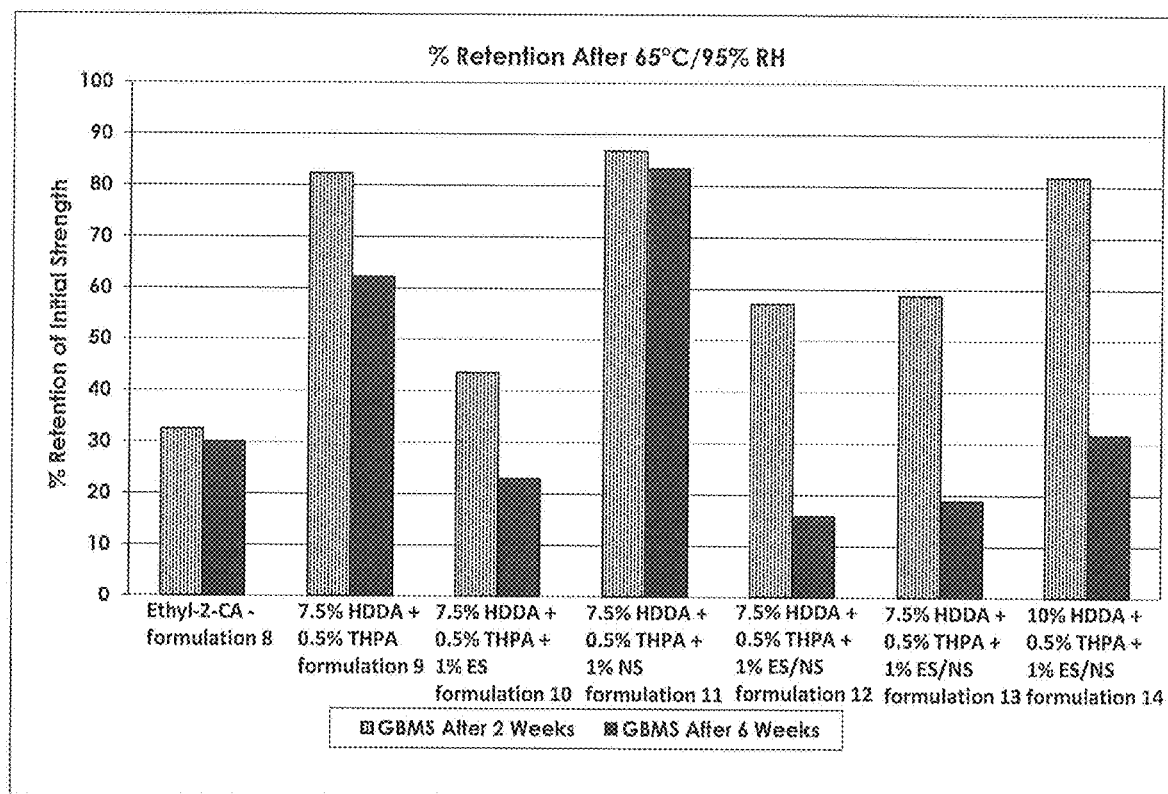
FIG. 10 shows the percentage retention of initial tensile strengths of cyanoacrylate formulations 8 to 14 on GBMS after heat ageing at 65° C. in 95% relative humidity for 2 weeks and 6 weeks.

Formulations were tested for percentage retention of initial tensile strengths after heat ageing at 65° C. in relative humidity of 95% on GBMS (see FIG. 10). Control formulation 8 retained about 30% of its initial tensile strength after 1000 hours.

Formulations 9 and 11 demonstrated excellent durability. Formulation 9, which comprises 7.5% HDDA and 0.5% THPA retained approximately 60% of its initial tensile strength after 1000 hours, whereas formulation 11 which further comprises 1% naphthosultone retained approximately 85% of its initial tensile strength value after 1000 hours.

The retention of initial tensile strengths for formulations comprising ethylene sulphite was significantly lower than for those formulations comprising HDDA and THPA but absent ethylene sulphite. Thus the addition of ethylene sulphite has a detrimental effect on the humid ageing result when tested on GBMS substrates after heat ageing at 65° C. in 95% relative humidity.

Advantageously, excellent humid ageing was observed for cyanoacrylate formulations comprising HDDA and THPA on GBMS. The addition of naphthosultone further improved the percentage retention of initial tensile strengths observed after humid heat ageing. While the addition of ethylene sulphite proved detrimental when heat ageing at 65° C. in 95% relative humidity was performed, this wasn't the case when heat ageing at 40° C. in 98% relative humidity was performed, wherein the percentage retention of initial tensile strength observed on GBMS and stainless steel substrates ranged from about 80% to over about 100% after 1000 hours.

Formulation 9 comprises THPA and HDDA as additives and the percentage of initial tensile strength retention after humid heat ageing as a consequence of said additives is clear. In comparison to control sample, formulation 9 retains approximately twice the initial tensile strength observed for GBMS substrate after heat ageing at 40° C. in 98% relative humidity over 3 weeks. This trend is also observed after heat ageing for 6 and 12 weeks.

The percentage of initial tensile strength observed for formulation 9 on stainless steel substrate is even more marked, with the initial strength being substantially maintained and an increase in tensile strength was even observed after heat ageing at 40° C. in 98% relative humidity over 6 weeks for stainless steel substrate.

Thus, cyanoacrylate compositions comprising: (a) a cyanoacrylate component, (b) a rubber toughening component comprised of (i) reaction products of the combination of ethylene, methyl acrylate and monomers having carboxylic acid cure sites, (ii) dipolymers of ethylene and methyl acrylate, and combinations of (i) and (ii), (c) a component containing at least two (meth)acrylate functional groups, such as HDDA, and (d) an anhydride component, such as THPA, when cured at room temperature between two substrates each of which being constructed from steel display excellent initial tensile strength retention after heat ageing at 40° C. in 98% relative humidity. Said compositions advantageously, retain greater than about 75% initial tensile strength retention after heat ageing at 40° C. in 98% relative humidity for a period of time of about 3 weeks. Additionally, said compositions retain greater than about 40% of initial tensile strength after exposure to a temperature of about 120° C. for a period of time of about 3 weeks.

In table 3 the initial tensile strength and the thermal performance of compositions comprising thermal resistance conferring additives are shown.

TABLE 3

|  | 15 | 16 | 17 | 18 | 19 | 20 | 21 |
|---|---|---|---|---|---|---|---|
| Ethyl CA | 77.9 | 76.9 | 76.9 | 76.9 | 76.9 | 76.9 | 76.9 |
| Stock Solution of BF₃ | 4.0 | 4.0 | 4.0 | 4.0 | 4.0 | 4.0 | 4.0 |
| Vamac VSC 5500 | 10.0 | 10.0 | 10.0 | 10.0 | 10.0 | 10.0 | 10.0 |
| Tetrahydro Phthalic Anhydride | 0.1 | 0.1 | 0.1 | 0.1 | 0.1 | 0.1 | 0.1 |
| HDDA MW 226 | 8.0 | 8.0 | 8.0 | 8.0 | 8.0 | 8.0 | 8.0 |
| 1,3-Propylene sulfite | — | 1.0 | — | — | — | — | — |
| 1,8-Naphthosultone | — | — | 1.0 | — | — | — | — |
| Sultone 1,3-Propane | — | — | — | 1.0 | — | — | — |
| Tetrafluoro-isophthalonitrile | — | — | — | — | 1.0 | — | — |
| Pentafluoro-benzonitrile | — | — | — | — | — | 1.0 | — |
| Pentafluoro-nitrobenzene | — | — | — | — | — | — | 1.0 |
| Inital Tensiles (GMBS) 24 hr @RT | | | | | | | |
| GBMS 1 Week RT Cure | 18.4 | 16.9 | 20.4 | 15.8 | 17.9 | 18.8 | 17.8 |

TABLE 3-continued

|  | 15 | 16 | 17 | 18 | 19 | 20 | 21 |
|---|---|---|---|---|---|---|---|
| Aging @ 100° C. | | | | | | | |
| 3 weeks | 27.2 | 25.1 | 24.8 | 27.5 | 27.7 | 25.9 | 24.3 |
| 6 weeks | 26.5 | 26.8 | 26.5 | 28.2 | 28.5 | 26.2 | 22.9 |
| Aging @ 120° C. | | | | | | | |
| 3 weeks | 11.7 | 23.7 | 22.4 | 21.7 | 26.4 | 24.7 | 22.0 |
| 6 weeks | 5.7 | 15.0 | 15.4 | 10.9 | 21.9 | 17.9 | 11.0 |

The thermal performances measured for formulations 16 to 21 were particularly good after heat ageing of said formulations on GBMS substrate at 120° C. for 3 weeks. Furthermore, formulation 19 which comprises 1.0 wt % tetrafluoroisophthalonitrile demonstrated excellent thermal performance, exhibiting a tensile strength after heat ageing for 6 weeks at 120° C. of approximately 22 MPa.

Further cyanoacrylate compositions are provided in Table 4.

TABLE 4

|  | 22 | 23 | 24 | 25 | 26 |
|---|---|---|---|---|---|
| Ethyl CA | 80.0 | 79.0 | 59.0 | 39.0 | — |
| Allyl CA | — | — | 20.0 | 40.0 | 81.1 |
| BF₃ (30 ppm) | 1.9 | 1.9 | 1.9 | 1.9 | 1.9 |
| Vamac VSC 5500 | 10.0 | 10.0 | 10.0 | 10.0 | 10.0 |
| HDDA MW 226 | 8.0 | 8.0 | 8.0 | 8.0 | 8.0 |
| Tetrahydro Phthalic Anhydride | 0.1 | 0.1 | 0.1 | 0.1 | 0.1 |
| Tetrafluoroisophthalonitrile | — | 1.0 | 1.0 | 1.0 | 1.0 |
| Initials | | | | | |
| GBMS 1 Week RT Cure | 21.6 | 20.2 | 18.0 | 17.5 | 15.8 |
| 100° C. | | | | | |
| 3 Weeks | 23.1 | 25.2 | 28.5 | 28.4 | 23.2 |
| 6 Weeks | 24.2 | 27.8 | 29.6 | 28.5 | 23.8 |
| 120° C. | | | | | |
| 3 Weeks | 7.6 | 24.7 | 23.8 | 17.2 | 23.4 |
| 6 Weeks | 4.4 | 20.7 | 15.5 | 13.8 | 11.2 |
| 160° C. | | | | | |
| 3 Weeks | — | 3.6 | 6.7 | 12.1 | 8.7 |
| 6 Weeks | — | 5.4 | 7.9 | 12.1 | 9.4 |
| 180° C. | | | | | |
| 3 Weeks | — | 3.5 | 4.8 | 12.8 | 11.2 |
| 6 Weeks | — | 3.1 | 4.1 | 8.9 | 13.3 |

Formulations 22 and 23 proved to have the greatest initial tensile strength when measured on GEMS substrate after curing for 1 week at room temperature.

A comparison of the performance of formulation 22 versus formulation 23 demonstrates the benefit of incorporating the thermal resistance conferring agent tetrafluoroisophthalonitrile in compositions of the invention.

Formulations 24 and 25 which comprise allyl CA also proved effective with an increase in tensile strength being observed after heat ageing at 100° C. for both 3 and 6 weeks.

Formulation 26 which comprises allyl CA as the cyanoacrylate component had an initial tensile strength on GBMS substrate after curing at room temperature for 1 week of approximately 16 MPa. The tensile strength improved after heat ageing at 100° C. for both 3 and 6 weeks. In addition the tensile strength for said formulation was approximately 23 MPa after heat ageing at 120° C. for 3 weeks.

The words "comprises/comprising" and the words "having/including" when used herein with reference to the present invention are used to specify the presence of stated features, integers, steps or components but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

What is claimed is:

1. A cyanoacrylate composition, comprising:
   (a) a cyanoacrylate component in an amount of from 80% to 90% by weight;
   (b) a rubber toughening agent comprised of (i) reaction products of the combination of ethylene, methyl acrylate and monomers having carboxylic acid cure sites, (ii) dipolymers of ethylene and methyl acrylate, and combinations of (i) and (ii), in an amount of 5% by weight to 15% by weight;
   (c) a component containing at least two (meth)acrylate functional groups represented by the formula:

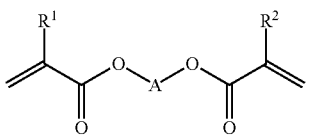

wherein A is a $C_4$ to $C_{20}$ aliphatic chain;
wherein said chain is optionally substituted with one or more acrylate or methacrylate functional groups, and/or one or more $C_1$ to $C_{10}$ alkyl groups; and
wherein R1 and R2 are the same or different and are each optionally selected from the group consisting of H and $C_1$ to $C_6$ alkyl, in an amount of 0.5% to 10% by weight; and
   (d) phthalic anhydride or a hydrogenated version thereof, in an amount of 0.1% to 1% by weight, each based on the total weight of the composition.

2. The composition according to claim 1, further comprising a filler.

3. The composition according to claim 2, wherein the filler is selected from the group consisting of carbon black, silica and combinations thereof.

4. The composition of claim 1, further comprising an acidic stabilizer and a free radical inhibitor.

5. The composition of claim 1, wherein the rubber toughening agent is present in an amount from 1.5% to 20% by weight.

6. The composition according to claim 1, wherein the cyanoacrylate component is has the structure $H_2C=C(CN)—COOR$, wherein R is selected from the group consisting of $C_{1-15}$ alkyl, alkoxyalkyl, cycloalkyl, alkenyl, aralkyl, aryl, allyl and haloalkyl groups.

7. The composition according to claim 6, wherein the cyanoacrylate component comprises ethyl-2-cyanoacrylate.

8. The composition according to claim 1, further comprising an accelerator component selected from the group consisting of calixarene, oxacalixarene, silacrown, cyclodextrin, crown ether, polyethyleneglycol) di(meth)acrylate, ethoxylated hydric compound, and combinations thereof.

9. The composition according to claim 8, wherein the calixarene is tetrabutyl tetra[2-ethoxy-2-oxoethoxy]calix-4-arene.

10. The composition according to claim 8, wherein the crown ether is selected from members within the group consisting of 15-crown-5, 18-crown-6, dibenzo-18-crown-6, benzo-15-crown-5-dibenzo-24-crown-8, dibenzo-30-crown-10, tribenzo-18-crown-6, asym-dibenzo-22-crown-6, dibenzo-14-crown-4, dicyclohexyl-18-crown-6, dicyclohexyl-24-crown-8, cyclohexyl-12-crown-4, 1,2-decalyl-15-crown-5, 1,2-naphtho-15-crown-5, 3,4,5-naphtyl-16-crown-5, 1,2-methyl-benzo-18-crown-6, 1,2-methylbenzo-5, 6-methylbenzo-18-crown-6, 1,2-t-butyl-18-crown-6, 1,2-vinylbenzo-15-crown-5, 1,2-vinylbenzo-18-crown-6, 1,2-t-butyl-cyclohexyl-18-crown-6, asym-dibenzo-22-crown-6, and 1,2-benzo-1,4-benzo-5-oxygen-20-crown-7 and combinations thereof.

11. The composition according to claim 8, wherein the poly(ethyleneglycol) di(meth)acrylate is within the following structure:

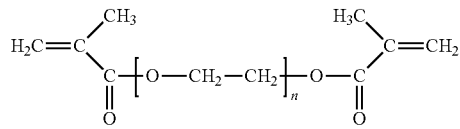

wherein n is greater than 3.

12. The composition according to claim 1, further comprising additives selected from the group consisting of shock resistant additives, thixotropy conferring agents, thickeners, dyes, thermal degradation resistance enhancers, and combinations thereof.

13. The composition according to claim 12, wherein the shock resistant additive is citric acid.

14. The composition according to Claim 1, wherein the cyanoaqylate is present in an amount of from 80% to 90% by weight, the rubber toughening agent is present in amount of 5% by weight to 15% by weight, the component comprising at least two (meth)aqylate functional groups is present in an amount of 0.5% to 10% by weight and the anhydride component is present in an amount of 0.1 % to 1% based on the total weight of the composition.

15. The composition according to claim 1, wherein the component containing at least two (meth)acrylate functional groups is hexane diol diacrylate.

16. The composition according to claim 1, wherein the anhydride component is tetrahydrophthalic anhydride.

17. The composition according to claim 1, wherein the component containing at least two (meth)acrylate functional groups is hexane diol diacrylate and the anhydride component is tetrahydrophthalic anhydride.

18. The composition according to claim 1, further comprising at least one additive selected from the group consisting of:
   2-sulfobenzoic acid anhydride, triethylene glycol di(para-toluene sulfonate), trifluoroethyl para-toluene sulfonate, dimethyl dioxolen-4-ylmethyl para-toluene sulfonate, para-toluene sulfonic anhydride, methane sulfonic anhydride, 1,3 propylene sulfite, dioxathiolene dioxide, 1,8-naphthosultone, sultone 1,3-propane, sultone 1,4-butene, allyl phenyl sulfone, 4-fluorophenyl sulfone, dibenzothiophene sulfone, bis(4-fluorophenyl) sulfone, ethyl p-toluenesulfonate, trifluoromethanesulfonic anhydride, ethylene sulphite and tetrafluoroisophthalonitrile and combinations thereof.

19. The composition according to claim 18, wherein the additive is selected from the group consisting of 1,8-naphthosultone and ethylene sulphite.

20. The composition according to claim 18 wherein the thermal resistance conferring agent is a mixture of 1,8-naphthosultone and ethylene sulphite.

21. A composition formed by curing the cyanoacrylate composition according to claim 1, wherein when the cyanoacrylate composition is cured at room temperature between two substrates each of which being constructed from steel, greater than about 75% of the initial tensile strength of the cured cyanoacrylate composition is retained after exposure to a temperature of about 40° C. at a relative humidity of about 98% and greater than about 40% of the initial tensile strength of the cured cyanoacrylate composition is retained after exposure to a temperature of about 120° C. for a period of time of about 3 weeks.

22. A method of bonding together two substrates, comprising the steps of:
applying the cyanoacrylate composition according to claim 1, to at least one of the substrates and
mating together the substrates to permit an adhesive bond to form from the cyanoacrylate composition between the mated substrates.

23. A method of preparing a cyanoacrylate composition according to claim 1, comprising the steps of:
providing allyl-2-cyanoacrylate component, a rubber toughening agent comprised of (i) reaction products of the combination of ethylene, methyl acrylate and monomers having carboxylic acid cure sites, (ii) dipolymers of ethylene and methyl acrylate, and combinations of (i) and (ii), and a component containing at least two (meth)acrylate functional groups represented by the formula:

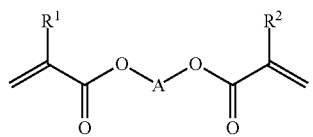

wherein A is a $C_4$ to $C_{30}$ aliphatic chain;
wherein said chain is optionally substituted with one or more acrylate or methacrylate functional groups, and/or one or more $C_1$-$C_{10}$ alkyl groups; and
wherein $R^1$ and $R^2$ are the same or different and are each optionally selected from the group consisting of H and $C_1$ to $C_6$ alkyl, and an anhydride component, wherein the anhydride component is phthalic anhydride or a hydrogenated version thereof and mixing to form the cyanoacrylate composition.

* * * * *